(12) United States Patent
Kangshang et al.

(10) Patent No.: US 10,129,044 B2
(45) Date of Patent: Nov. 13, 2018

(54) METHOD AND APPARATUS FOR CONTROLLING SMART DEVICE

(71) Applicant: Xiaomi Inc., Beijing (CN)

(72) Inventors: Mingxue Kangshang, Beijing (CN); Ying Wang, Beijing (CN); Chengxing Gao, Beijing (CN)

(73) Assignee: Xiaomi Inc., Beijing (CN)

( * ) Notice: Subject to any disclaimer, the term of this patent is extended or adjusted under 35 U.S.C. 154(b) by 224 days.

(21) Appl. No.: 15/093,931

(22) Filed: Apr. 8, 2016

(65) Prior Publication Data

US 2016/0226674 A1   Aug. 4, 2016

Related U.S. Application Data

(63) Continuation of application No. PCT/CN2015/093857, filed on Nov. 5, 2015.

(30) Foreign Application Priority Data

Dec. 31, 2014   (CN) .......................... 2014 1 0856491

(51) Int. Cl.
*H04L 12/28* (2006.01)
*G06F 3/0481* (2013.01)
(Continued)

(52) U.S. Cl.
CPC ........ *H04L 12/2803* (2013.01); *G05B 19/042* (2013.01); *G06F 3/0481* (2013.01);
(Continued)

(58) Field of Classification Search
CPC ... H04L 12/2803; H04W 12/08; G05B 19/042
See application file for complete search history.

(56) References Cited

U.S. PATENT DOCUMENTS

2003/0095156 A1   5/2003   Klein et al.
2004/0103153 A1   5/2004   Chang et al.
(Continued)

FOREIGN PATENT DOCUMENTS

CN   201589976 U   9/2010
CN   201758454 U   3/2011
(Continued)

OTHER PUBLICATIONS

International Search Report of PCT/CN2015/093857, mailed from the State Intellectual Property Office of China dated Feb. 17, 2016.
(Continued)

*Primary Examiner* — Vincent H Tran
(74) *Attorney, Agent, or Firm* — Finnegan, Henderson, Farabow, Garrett & Dunner LLP

(57) ABSTRACT

The present disclosure relates to a method and an apparatus for controlling a smart device. The method includes: when a screen of the terminal is locked and it is determined that a user performs a first preset operation on a control key on the lock screen of the terminal, acquiring information regarding at least one smart device through a preset smart-home Internet-of-Things (IoT) protocol and displaying the acquired information on a control interface of the terminal; and when it is detected that the user performs a second preset operation related to a smart device displayed on the control interface, controlling, according to the second preset operation, the smart device through the smart-home IoT protocol.

18 Claims, 11 Drawing Sheets

(51) Int. Cl.
    *G05B 19/042*     (2006.01)
    *H04W 12/08*     (2009.01)
    *G06F 21/31*     (2013.01)
    *H04L 12/64*     (2006.01)
    *H04W 12/06*     (2009.01)
    *H04W 88/02*     (2009.01)

(52) U.S. Cl.
    CPC .......... *G06F 21/31* (2013.01); *H04L 12/6418* (2013.01); *H04W 12/08* (2013.01); *G05B 2219/2642* (2013.01); *H04W 12/06* (2013.01); *H04W 88/02* (2013.01)

(56) References Cited

U.S. PATENT DOCUMENTS

| | | | |
|---|---|---|---|
| 2010/0306718 A1 | 12/2010 | Shim et al. | |
| 2011/0283241 A1 | 11/2011 | Miller et al. | |
| 2012/0023212 A1* | 1/2012 | Roth | H04L 12/282 709/223 |
| 2012/0191993 A1* | 7/2012 | Drader | G06F 1/3215 713/320 |
| 2013/0214935 A1 | 8/2013 | Kim et al. | |
| 2014/0067131 A1 | 3/2014 | Park et al. | |
| 2014/0241354 A1 | 8/2014 | Shuman et al. | |
| 2015/0033361 A1* | 1/2015 | Choi | G06F 21/60 726/27 |
| 2015/0286263 A1* | 10/2015 | Heo | G06F 1/3206 713/320 |
| 2016/0139752 A1* | 5/2016 | Shim | G06F 3/0483 715/771 |
| 2016/0174146 A1* | 6/2016 | Wang | H04W 76/00 370/254 |
| 2016/0277204 A1* | 9/2016 | Kang | H04L 12/2809 |

FOREIGN PATENT DOCUMENTS

| | | |
|---|---|---|
| CN | 102705965 A | 10/2012 |
| CN | 102750066 A | 10/2012 |
| CN | 102984603 A | 3/2013 |
| CN | 103164143 A | 6/2013 |
| CN | 103197759 A | 7/2013 |
| CN | 103685451 A | 3/2014 |
| CN | 103763413 A | 4/2014 |
| CN | 104238883 A | 12/2014 |
| CN | 104503688 A | 4/2015 |
| JP | 2001-127897 A | 5/2001 |
| JP | 2013-041512 A | 2/2013 |
| JP | 2014-150512 A | 8/2014 |
| JP | 2014-150543 A | 8/2014 |
| JP | 2014-191628 A | 10/2014 |
| JP | 6220993 B2 | 10/2017 |
| KR | 10-2014-0032262 A | 3/2014 |
| KR | 10-2014-0094090 A | 7/2014 |
| RU | 130098 U1 | 7/2013 |
| WO | WO 2014/155196 A1 | 10/2014 |
| WO | WO 2014/210304 A1 | 12/2014 |

OTHER PUBLICATIONS

English version of International Search Report of PCT/CN2015/093857, mailed from the State Intellectual Property Office of China dated Feb. 17, 2016.

Office Action Issued in Russian Patent Application No. 2016102420/08(003540), dated Mar. 21, 2017.

Extended European Search Report issued in European Patent Application No. 15868671.7, mailed from the European Patent Office, dated Jun. 18, 2018.

\* cited by examiner

400

METHOD AND APPARATUS FOR CONTROLLING SMART DEVICE

CROSS-REFERENCE TO RELATED APPLICATIONS

This application is a continuation of International Application No. PCT/CN2015/093857, filed Nov. 5, 2015, which is based upon and claims priority to Chinese Patent Application No. 201410856491.X, filed Dec. 31, 2014, the entire contents of all of which are incorporated herein by reference.

TECHNICAL FIELD

The present disclosure relates to the field of Internet technology and, more particularly, to a method and an apparatus for controlling a smart device.

BACKGROUND

With the rapid development of smart home technologies, more and more smart home devices are entering people's daily lives and smart phones have played a central role in controlling these smart home devices. In the related arts, using a smart phone to control a smart home device is realized by installing a corresponding smart device application on the smart phone. Conventionally, when a user wants to control a particular smart home device but a screen of the smart phone is locked, the user needs to unlock the screen of the smart phone first. The user then needs to find the corresponding application on the home screen of the smart phone. The user further needs to click the application to enter a user interface of the application, and control the smart home device by performing related operations on the user interface. However, this manner of controlling a smart home device is cumbersome and leads to poor user experience.

SUMMARY

According to a first aspect of the present disclosure, there is provided a method for use in a terminal, comprising: when a screen of the terminal is locked and it is determined that a user performs a first preset operation on a control key on the lock screen of the terminal, acquiring information regarding at least one smart device through a preset smart-home Internet-of-Things (IoT) protocol and displaying the acquired information on a control interface of the terminal; and when it is detected that the user performs a second preset operation related to a smart device displayed on the control interface, controlling, according to the second preset operation, the smart device through the smart-home IoT protocol.

According to a second aspect of the present disclosure, there is provided an apparatus for controlling a smart device, comprising: a processor; and a memory storing instructions executable by the processor; wherein the processor is configured to: when a screen of the apparatus is locked and it is determined that a user performs a first preset operation on a control key on the lock screen, acquire information regarding at least one smart device through a preset smart-home IoT protocol and display the acquired information on a control interface; and when it is detected that the user performs a second preset operation related to a smart device displayed on the control interface, controlling, according to the second preset operation, the smart device through the smart-home IoT protocol.

According to a third aspect of the present disclosure, there is provided a non-transitory computer-readable storage medium storing instructions that, when executed by a processor in an apparatus for controlling a smart device, cause the apparatus to perform: when a screen of the apparatus is locked and it is determined that a user performs a first preset operation on a control key on the lock screen, acquiring information regarding at least one smart device through a preset smart-home IoT protocol and displaying the acquired information on a control interface; and when it is detected that the user performs a second preset operation related to a smart device displayed on the control interface, controlling, according to the second preset operation, the smart device through the smart-home IoT protocol.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

Figure 1A:
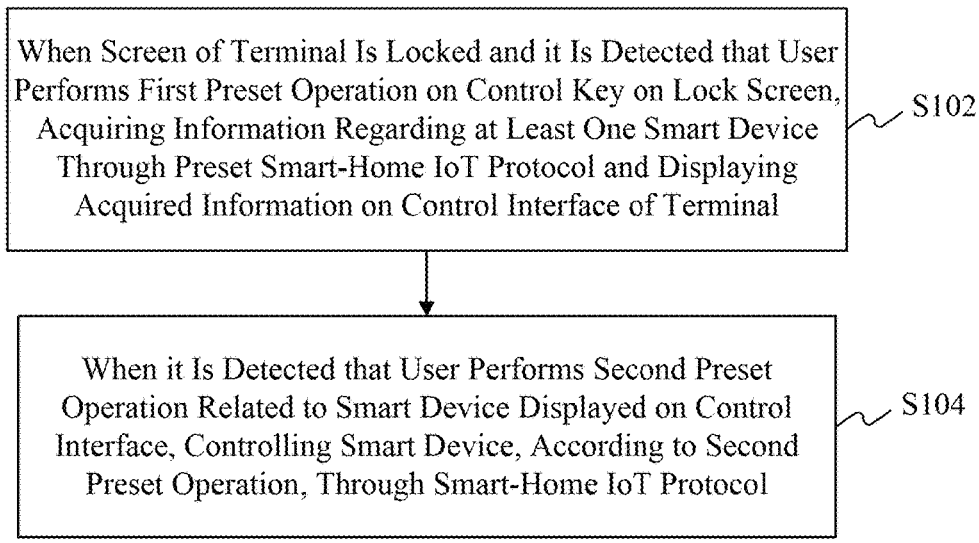
FIG. 1A is a flowchart of a method for controlling a smart device, according to an exemplary embodiment.

FIG. 1A is a flowchart of a method 100 for controlling a smart device, according to an exemplary embodiment. For example, the method 100 may be applied in a terminal, such as a smart phone or a tablet computer. Referring to FIG. 1A, the method 100 includes the following steps S102 and S104.

In step S102, when a screen of the terminal is locked and the terminal detects that a user performs a first preset operation on a control key on the lock screen, the terminal acquires information regarding at least one smart device through a preset smart-home Internet-of-Things (IoT) protocol and displays the acquired information on a control interface of the terminal.

Figure 1B:
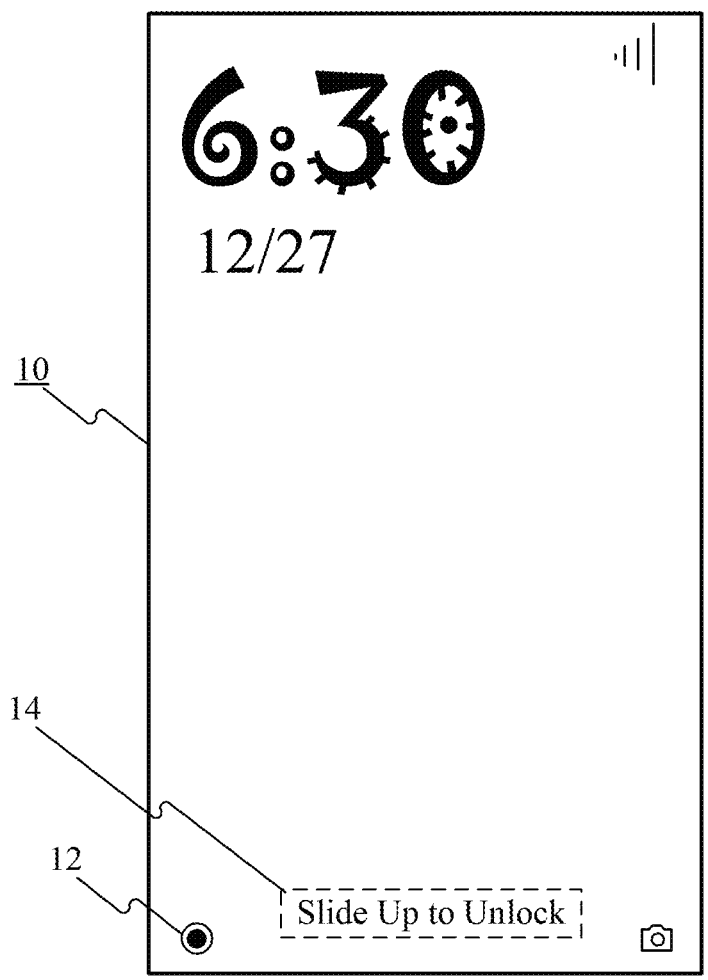
FIG. 1B is a schematic diagram illustrating a lock screen of a terminal, according to an exemplary embodiment.
Figure 1C:
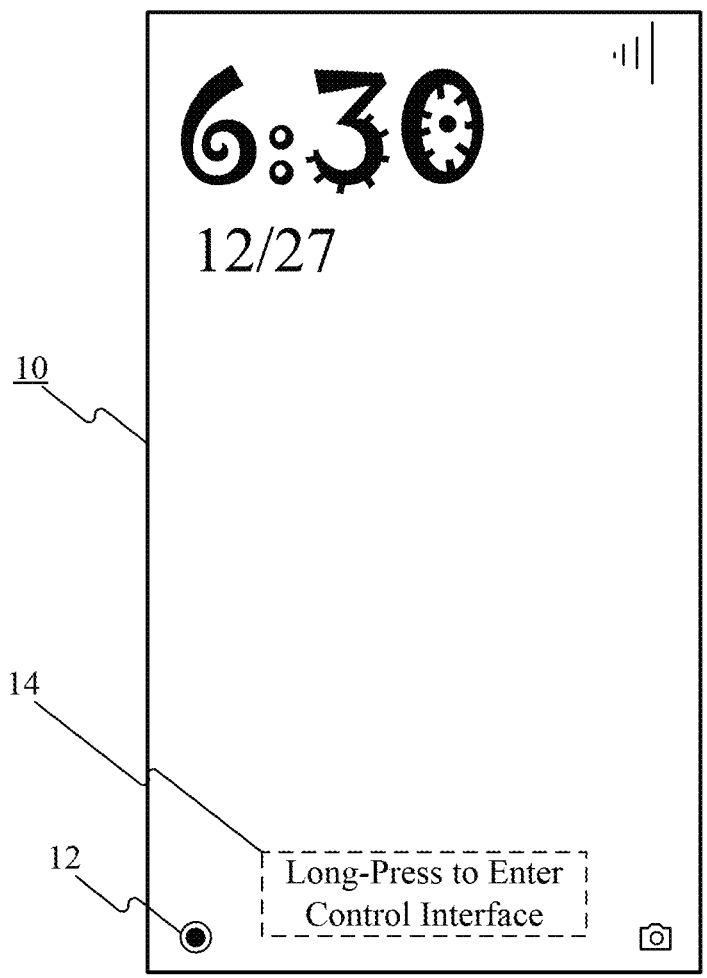
FIG. 1C is a schematic diagram illustrating a lock screen of a terminal, according to an exemplary embodiment.
Figure 1D:
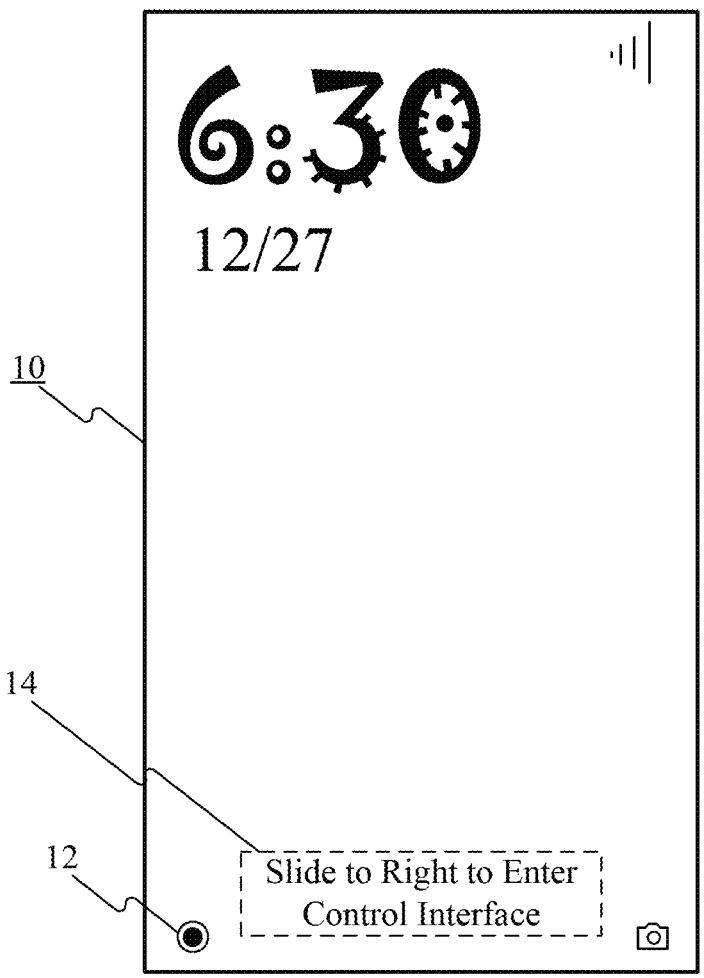
FIG. 1D is a schematic diagram illustrating a lock screen of a terminal, according to an exemplary embodiment.

FIG. 1B is a schematic diagram illustrating a lock screen 10 of a terminal, according to an exemplary embodiment. Referring to FIG. 1B, the lock screen 10 may include a control key 12 and a prompt box 14. The prompt box 14 may display a message, such as: "slide up to unlock." The first preset operation is configured to operate the control key 12 to display the control interface. In some exemplary embodiments, the first preset operation may be one of a long-press operation on the control key 12, a click (for example, single-click or double-click) operation on the control key 12, or an operation of sliding the control key 12 in a preset direction, etc. FIG. 1C is a schematic diagram illustrating a lock screen 10 of a terminal, according an exemplary embodiment. Referring to FIG. 1C, the prompt box 14 on the lock screen 10 may display that the first preset operation on the control key 12 is "long-press to enter control interface." FIG. 1D is a schematic diagram illustrating a lock screen 10 of a terminal, according to another exemplary embodiment. Referring to FIG. 1D, the prompt box 14 on the lock screen 10 may display that the first preset operation on the control key 12 is "slide to right to enter control interface." In both examples illustrated in FIGS. 1C and 1D, the user may perform the first preset operation on the control key 12 according to the message displayed by the prompt box 14.

Figure 1E:
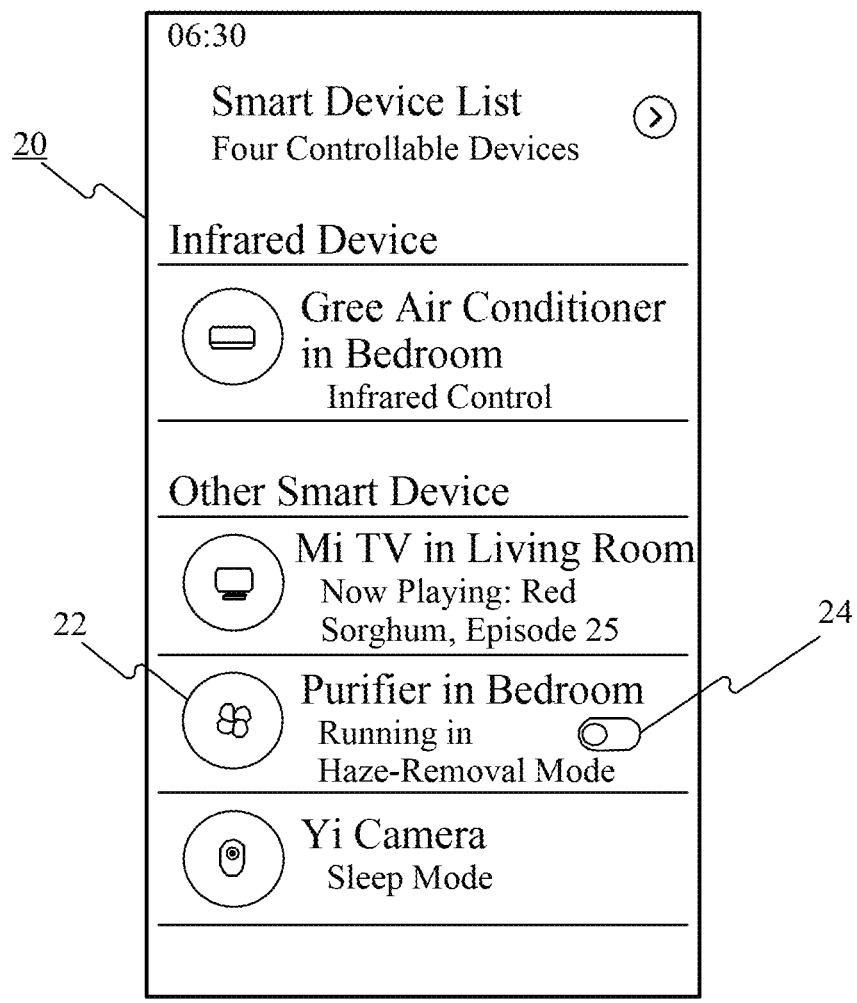
FIG. 1E is a schematic diagram illustrating a control interface, according to an exemplary embodiment.

After detecting the first preset operation, the terminal may acquire information regarding at least one smart device through the preset smart-home IoT protocol and display the acquired information on the control interface. For example, the terminal may acquire information of multiple smart devices through the preset smart-home IoT protocol, the multiple smart devices corresponding to one or more applications controlling the smart devices. The control interface may be displayed on the lock screen of the terminal. FIG. 1E is a schematic diagram illustrating a control interface 20, according to an exemplary embodiment. Referring to FIG. 1E, the terminal may first determine display parameters of the control interface 20 and then display the control interface 20 on the lock screen according to the display parameters. In the embodiment shown in FIG. 1E, the control interface 20 may be configured to cover the lock screen. In other embodiments, the terminal may adjust the size of the control interface 20 displayed on the lock screen, according to the display parameters. Still referring to FIG. 1E, the terminal may display in the control interface 10 a smart device list. Each smart device in the list may be shown by a device icon, a device name, a current status, and/or a shortcut for controlling the smart device to perform certain operations. The list may divide the smart devices into different categories, such as "infrared device" and "other smart device." For example, the smart device list displayed in the control interface 20 may include a smart device named "purifier in bedroom." An icon 22 of the purifier is displayed on the left side of "purifier in bedroom", and a control shortcut 24 of the purifier is displayed on the right side of "purifier in bedroom." The control shortcut may be used to turn on or off of the purifier. Furthermore, below the name of the purifier, there is also displayed a current status of the purifier, e.g., "running in haze-removal mode." For another example, the smart device list may also include an infrared device named "Gree air conditioner in bedroom." The current status of the air conditioner displayed is displayed below the name of the air conditioner, indicating the air conditioner is operating in an "infrared control" mode.

In step S104, when the terminal detects that the user performs a second preset operation related to a smart device displayed on the control interface, the terminal controls the smart device according to the second preset operation through the smart-home IoT protocol.

With continued reference to FIG. 1E, the second preset operation may be clicking the icon or name of a smart device in the smart device list, or clicking a control shortcut associated with the smart device. For example, if the user clicks "purifier in bedroom," the terminal may start a smart device application corresponding to the "purifier in bedroom" and display a user interface of the application on the control interface 20. For another example, if the user clicks the control shortcut 24 on the right side of "purifier in bedroom", the user may directly turn on or off the "purifier in bedroom" through the second preset operation. This way, the user may control the "purifier in bedroom" within the control interface 20, avoiding operations of first unlocking the lock screen of the terminal and then starting the smart application of the "purifier in bedroom."

In one embodiment, the first preset operation is a long-press on the control key. Accordingly, step S102 may further include: the terminal monitors whether the user long-presses the control key; and when detecting a long-press on the control key, the terminal determines that the user performs the first preset operation on the control key on the lock screen of the terminal.

In one embodiment, the first preset operation is a click on the control key. Accordingly, step S102 may further include: the terminal monitors whether the user clicks the control key; and when detecting a click on the control key, the terminal determines that the user performs the first preset operation on the control key on the lock screen of the terminal.

In one embodiment, the first preset operation is a slide on the control key in a preset direction, Accordingly, step S102 may further include: the terminal detects the direction in which the user slides the control key; when the sliding direction matches the preset direction, the terminal determines that the user performs the first preset operation on the control key on the lock screen of the terminal.

In one embodiment, according to the smart-home IoT protocol, a smart device application provided by a third party can be created as a standardized service through a well-defined interface. Thus, devices abiding by the same smart-home IoT protocol can communicate and be controlled through the protocol. The use of the smart-home IoT has several benefits. First, the smart-home IoT protocol may adopt a uniform manner to describe the physical world, so that all smart devices may consistently describe themselves and their services through the same protocol. This way, a variety of devices can be made compatible with each other. Moreover, the smart-home IoT protocol uses a unified call interface, and thus makes the development of third-party smart device applications easier. Furthermore, by using the smart-home IoT protocol as a center of receiving user instructions and providing information regarding the smart devices, the third-party smart device applications do not need to constantly keep running in the memory of the terminal, thereby both saving the memory space and reducing the power consumption of the terminal.

For example, the preset smart-home IoT protocol is a MiHome protocol. The MiHome protocol is a set of technical specifications configured to operate smart devices according to application software, and implement functions of the hardware according to services of software. Through the MiHome protocol, the terminal can communicate with all the smart devices connected to the terminal and/or call third-party smart device applications. For example, through the MiHome protocol, the terminal may send a control instruction to a smart air purifier to turn on the purifier, or call the user interface of a smart device application installed on the terminal.

In one embodiment, the method 100 may further include: the terminal displays the user interface of a smart device application on the lock screen; and the terminal controls a smart device corresponding to the smart device application through the user interface. The controlling of the smart device through the user interface may further include: the terminal detects an instruction entered by the user on the user interface; and the terminal sends the instruction to the smart device through the smart-home IoT protocol.

From the above description, it can be seen that the method 100 does not require the user to unlock the terminal to enter a corresponding smart device application to control a smart device. Thus, method 100 simplifies the process of controlling a smart device, and provides a convenient way for controlling the smart device in the lock-screen mode of the terminal. Moreover, since the terminal calls the smart device application through the smart-home IoT protocol, the terminal may control the smart device without opening the smart device application. Thus, the method 100 may avoid the memory of the terminal being constantly occupied by the smart device application, thereby both saving the memory space and reducing the power consumption of the terminal.

Figure 2:
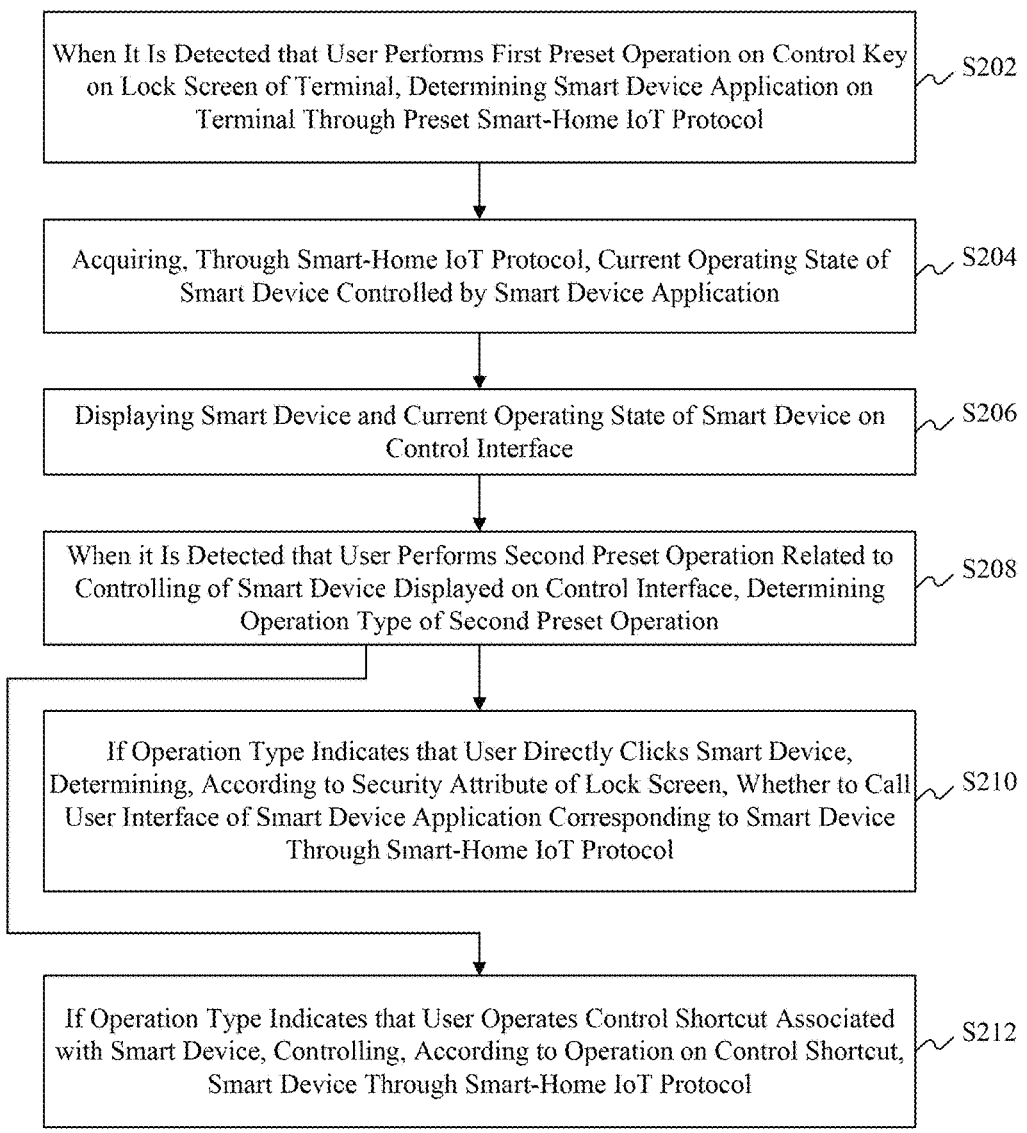
FIG. 2 is a flowchart of a method for controlling a smart device, according to an exemplary embodiment.

FIG. 2 is a flowchart of a method 200 for controlling a smart device, according to an exemplary embodiment. For example, the smart device can be controlled through a control interface of a terminal. A smart device application may be installed on the terminal and used to control at least one smart device. Referring to FIG. 2, the method 200 includes the following steps.

In step S202, when the terminal detects that a user performs a first preset operation on a control key on a lock screen of the terminal, the terminal determines a smart device application on the terminal through a preset smart-home IoT protocol.

In step S204, the terminal acquires, through the smart-home IoT protocol, a current operating state of a smart device controlled by the smart device application.

In step S206, the terminal displays the smart device and the current operating state of the smart device on the control interface.

In the following, an exemplary implementation of steps S202-S206 is described by referring to FIGS. 1D and 1E. As shown in FIG. 1D, after the user performs the first preset operation as indicated by the prompt box 14, i.e., "slide right to enter into control interface," the terminal displays a control interface and determines the smart device applications installed on the terminal. As shown in FIG. 1E, for example, the terminal may be installed with four smart device applications, including "Gree air conditioner in bedroom", "Mi TV in living room", "purifier in bedroom", and "yi camera," as being displayed on the control interface 20. One smart device may only correspond to one smart device application. Alternatively, two or more smart devices correspond to one smart device application (i.e., one smart device application can be used to control two or more smart devices). In one embodiment, the terminal may determine the installed smart device applications by calling the Application Programming Interface (API) of the smart device applications through the smart-home IoT protocol. Furthermore, the terminal may determine the current state of each smart device, and display the smart devices controlled by the smart device applications and information regarding the current states of the smart devices on the control interface 20.

In step S208, when the terminal detects that the user performs a second preset operation related to the controlling of a smart device displayed on the control interface, the terminal determines the operation type of the second preset operation.

Still referring to FIG. 1E, the second preset operation may be a click on a smart device displayed on the control interface 20, or a click on a control shortcut associated with the smart device. Therefore, after detecting the position on the control interface 20 that is clicked by the user, the terminal may determine the operation type of the second preset operation, and further control the smart device according to the operation type.

In step S210, if the operation type indicates that the user directly clicks the smart device, the terminal determines, according to the security attribute of the lock screen, whether to call a user interface of the smart device application corresponding to the smart device through the smart-home IoT protocol.

In one embodiment, the user may set a login password for the lock screen. For example, the password may be characters input from a keyboard, gestures, and fingerprints. When the user click the smart device to call the user interface of the corresponding smart device application, the terminal may display a password authentication page for verify the user's identity, so as to ensure that only a legitimate user of the terminal performs a legitimate operation on the smart device and avoid an illegitimate user from performing an illegitimate operation on the smart device. Referring to FIG. 1E, for example, after the user clicks "purifier in bedroom," a corresponding identity authentication page may pop up to authenticate the identity of the user. If the user passes the authentication, the terminal calls the user interface of the smart device application corresponding to the "purifier in bedroom." Such measure can prevent illegitimate operations on "purifier in bedroom" by an illegitimate user, such as deliberately running the "purifier in bedroom" to waste the electricity when no one is at home.

In step S212, if the operation type indicates that the user operates a control shortcut associated with the smart device, the terminal controls, according to the operation on the control shortcut, the smart device through the smart-home IoT protocol.

In one embodiment, the control shortcut is used for enabling a quick and convenient operation on the smart device, and the operation will not bring great losses to the legitimate users. By clicking the control shortcut, the user can directly perform a shortcut operation on the smart device. This way, the user can quickly achieve the control of the smart device. For example, referring to FIG. 1E, when a user clicks the control shortcut 24 on the right side of "purifier in bedroom," the terminal may directly turn on or turn off the "purifier in bedroom."

By classifying the operation types of the second preset operations, the method 200 differentiates the security levels of the second preset operation. Therefore, on the basis of ensuring normal operations by the legitimate users, the method 200 can safely and quickly control smart devices through the smart-home IoT protocol.

Figure 3:
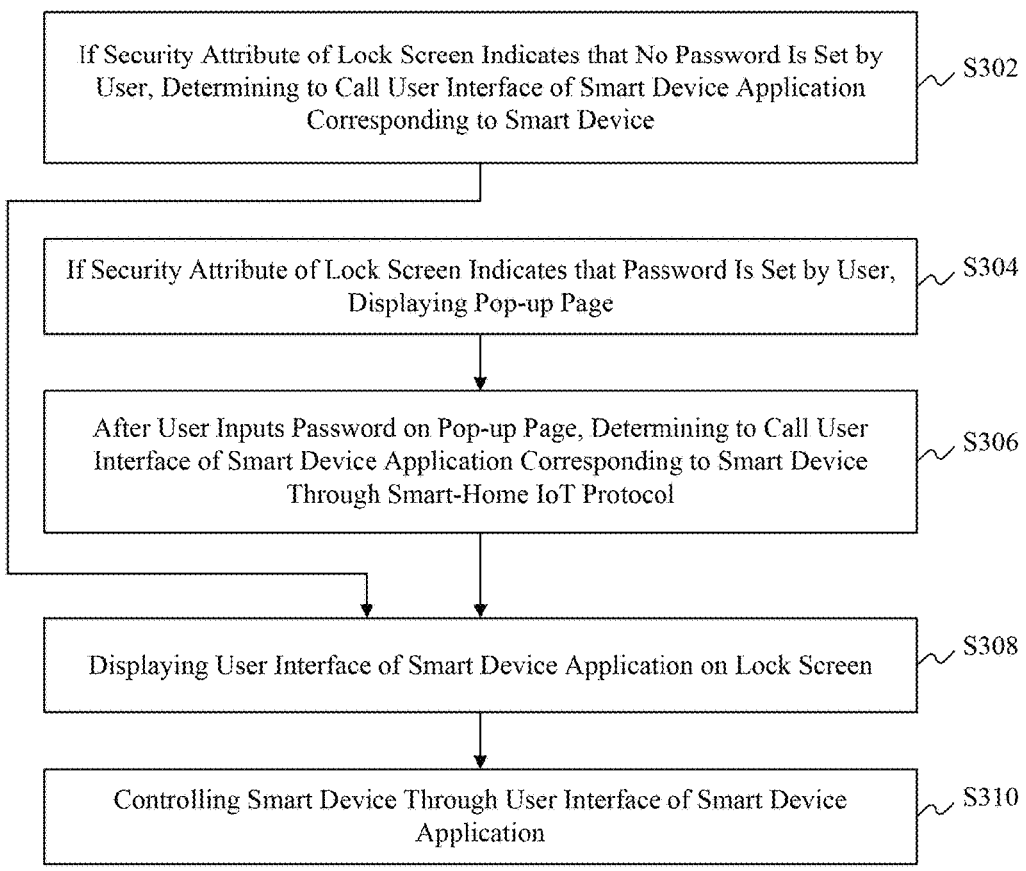
FIG. 3 is a flowchart of a method for controlling a smart device, according to an exemplary embodiment.

FIG. 3 is a flowchart of a method 300 for controlling a smart device, according to an exemplary embodiment. For example, the method 300 may be used in a terminal having a lock screen. The method 300 may be used in conjunction with the method 200 and pertains to the operation of calling a user interface of a smart device application according to the security attribute of the lock screen. Referring to FIG. 3, the method 300 includes the following steps.

In step S302, if the security attribute of the lock screen indicates that no password is set for the lock screen by the user, the terminal determines to call the user interface of the smart device application corresponding to the smart device, and proceeds to step S308.

In step S304, if the security attribute of the lock screen indicates that a password is set for the lock screen by the user, the terminal displays a pop-up page for the user to input the password, and proceeds to step S306.

In step S306, after the user inputs the password on the pop-up page, the terminal determines to call the user interface of the smart device application corresponding to the smart device through the smart-home IoT protocol, and proceeds to step S308.

In step S308, the terminal displays the user interface of the smart device application on the lock screen, and proceeds to step S310.

In step S310, the terminal controls the smart device through the user interface of the smart device application, and the method 300 ends.

For example, referring to FIG. 1E again, the user may set a login password for the lock screen. When the user clicks "purifier in bedroom," a page may pop up to receive input of the password. After the user inputs the password, the terminal calls the user interface of the smart device application corresponding to the "purifier in bedroom." The user may further control the operations of the "purifier in bedroom" on the user interface, such as adjusting purification parameters of the "purifier in bedroom."

The method 300 determines whether a user is authorized to access a user interface based on the security attribute of the lock screen, thereby ensuring that the security levels of the lock screen and the user interface are consistent. In this manner, the method 300 ensures that the legitimate user can control the smart device normally, and prevent illegitimate users from performing unauthorized operations on the smart device.

Figure 4:
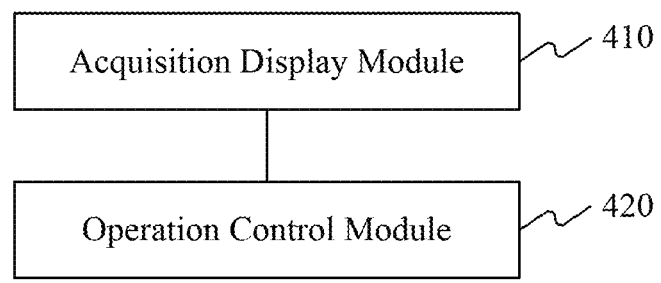
FIG. 4 is a block diagram of an apparatus for controlling a smart device, according to an exemplary embodiment.

FIG. 4 is a block diagram of an apparatus 400 for controlling a smart device, according to an exemplary embodiment. For example, the apparatus 400 may be part or whole of a terminal. Referring to FIG. 4, the apparatus 400 includes an acquisition display module 410 and an operation control module 420.

The acquisition display module 410 is configured to, when the apparatus 400 is in a lock-screen mode and detects that a user performs a first preset operation on a control key on the lock screen, acquire information regarding at least one smart device through a preset smart-home IoT protocol and display the acquired information on a control interface of the apparatus 400

The operation control module 420 is configured to, when the apparatus 400 detects that the user performs on the control interface a second preset operation related to a smart device displayed on the control interface, control the smart device according to the second preset operation through the smart-home IoT protocol.

Figure 5:
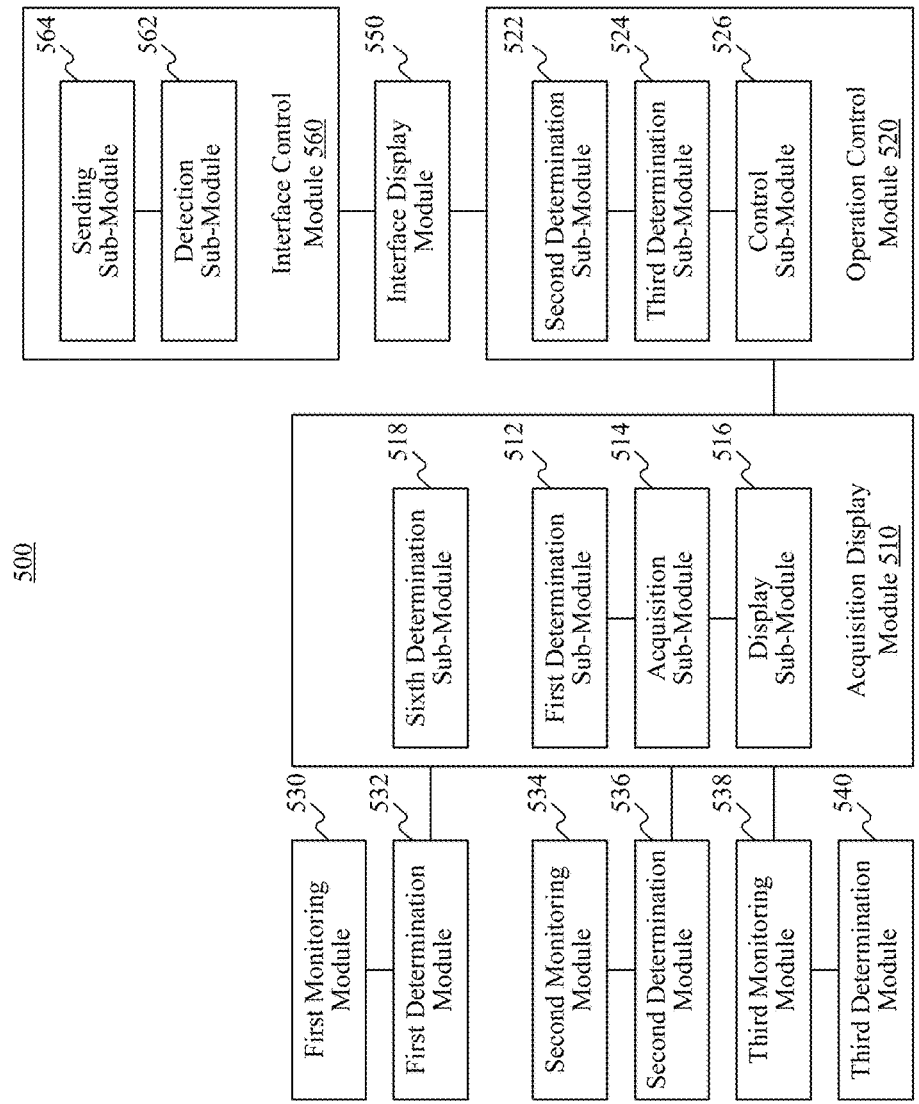
FIG. 5 is a block diagram of an apparatus for controlling a smart device, according to an exemplary embodiment.

FIG. 5 is a block diagram of an apparatus 500 for controlling a smart device, according to an exemplary embodiment. For example, the apparatus 500 may be part or whole of a terminal. Referring to FIG. 5, the apparatus 500 includes an acquisition display module 510 and an operation control module 520, similar to the acquisition display module 410 and an operation control module 420 (FIG. 4), respectively.

In one embodiment, the first preset operation may include a long-press operation on the control key. Accordingly, the apparatus 500 further include a first monitoring module 530 and a first determination module 532. The first monitoring module 530 is configured to monitor whether a long-press is performed on the control key on the lock screen. The first determination module 532 is configured to, when a long-pass on the control key is detected, determine that the user performs the first preset operation on the control key.

In one embodiment, the first preset operation may include a click operation on the control key. Accordingly, the apparatus 500 further includes a second monitoring module 534 and a second determination module 536. The second monitoring module 534 is configured to monitor whether the user clicks the control key. The second determination module is configured to, when a click on the control key is detected, determine that the user performs the first preset operation on the control key.

In one embodiment, the first preset operation may include a slide operation on the control key in a preset direction. Accordingly, the apparatus 500 further includes a third monitoring module 538 and a third determination module 540. The third monitoring module 538 is configured to detect a direction in which the user slides the control key. The third determination module 540 is configured to, when the sliding direction matches a preset direction, determine that the user performs the first preset operation on the control key.

In one embodiment, the preset smart-home IoT protocol is a MiHome protocol.

In one embodiment, the acquisition display module 510 may further include a first determination sub-module 512, an acquisition sub-module 514, and a display sub-module 516. The first determination sub-module 512 is configured to determine a smart device application on the apparatus 500 through the preset smart-home IoT protocol. The acquisition sub-module 514 is configured to acquire, through the preset smart-home IoT protocol, the current operating status of a smart device controllable by the smart device application. The display sub-module 516 is configured to display the smart device and the operating status of the smart device on the control interface.

In one embodiment, the operation control module 520 may further include a second determination sub-module 522, a third determination sub-module 524, and a control sub-module 526. The second determination sub-module 522 is configured to determine an operation type of the second preset operation. The third determination sub-module 524 is configured to, if the operation type is an operation on a smart device on the control interface, determine, according to a security attribute of the lock screen, whether to call the user interface of a smart device application corresponding to the smart device through the smart-home IoT protocol. The control sub-module 526 is configured to, if the operation type is an operation on a control shortcut associated with a smart device displayed on the control interface, control, according to the operation on the control shortcut, the smart device through the smart-home IoT protocol.

Figure 6:
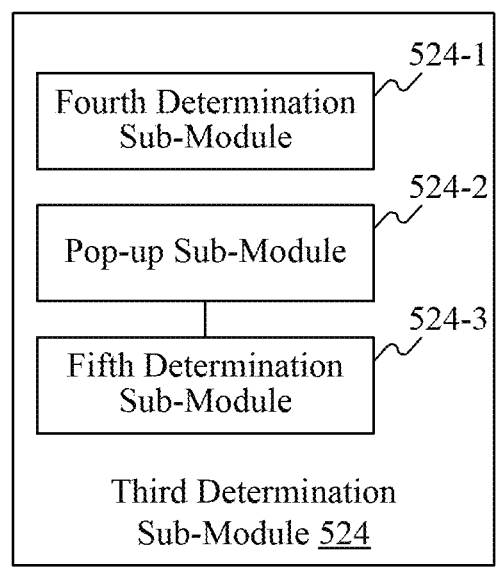
FIG. 6 is a block diagram of a third determination sub-module in an apparatus for controlling a smart device, according to an exemplary embodiment.

FIG. 6 is a block diagram of the third determination sub-module 524 (FIG. 5), according to an exemplary embodiment. Referring to FIG. 6, the third determination sub-module 524 may include a fourth determination sub-module 524-1, a pop-up sub-module 524-2, and a fifth determination sub-module 524-3.

The fourth determination sub-module 524-1 is configured to, if the security attribute of the lock screen indicates that no password is set for the lock screen by the user, determine to call the user interface of the smart application corresponding to the smart device.

The pop-up sub-module 524-2 is configured to, if the security attribute of the lock screen indicates that a password is set for the lock screen by the user, display a pop-up page to receive input of the password.

The fifth determination sub-module 524-3 is configured to, after the user inputs the password on the pop-up page, determine to call the user interface of the smart application corresponding to the smart device through the smart-home IoT protocol.

Referring to FIG. 5, in one embodiment, the apparatus 500 further includes an interface display module 550 and an interface control module 560. The interface display module 550 is configured to display on the lock screen the user interface of the smart device application determined to be called by the third determination sub-module 524. The interface control module 560 is configured to control the any one smart device on the user interface of the smart device application displayed by the interface display module 49

In one embodiment, the interface control module 560 may further include a detection sub-module 562 and a sending sub-module 564. The detection sub-module 562 is configured to detect a user instruction entered on the user interface displayed by the interface display module 550. The sending sub-module 564 is configured to send the user instruction to the smart device through the smart-home IoT protocol.

In one embodiment, the acquisition display module 510 further includes a sixth determination sub-module 518 configured to determine display parameters of the control interface displayed by the acquisition display module 510, and cause the acquisition display module 510 to display the control interface on the lock screen according to the display parameters.

With respect to the modules/sub-modules in the above embodiments, the specific manners for individual modules/sub-modules to perform operations therein have been described in detail in the embodiments regarding the related methods, which will not be repeated here.

Figure 7:
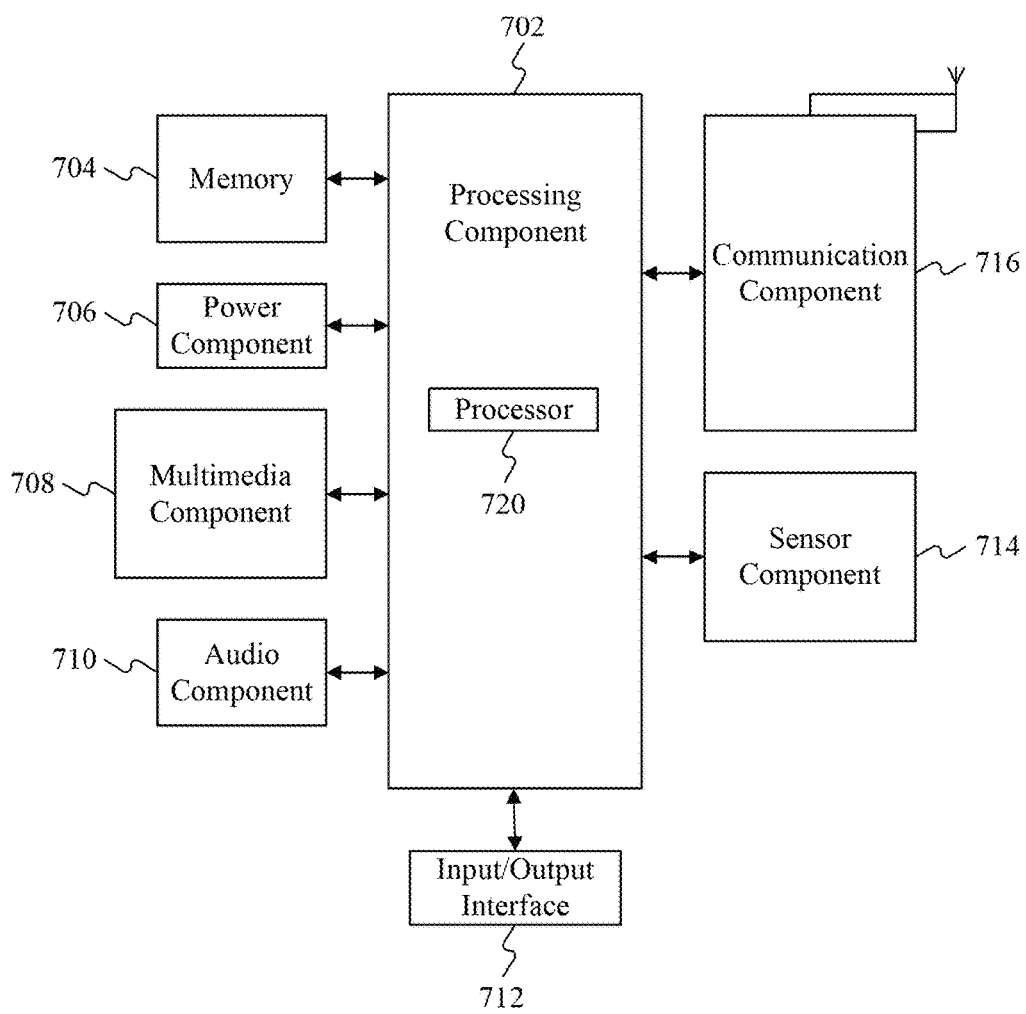
FIG. 7 is a block diagram of an apparatus for controlling a smart device, according to an exemplary embodiment.

FIG. 7 is a block diagram of an apparatus 700 for controlling a smart device, according to an exemplary embodiment. For example, the apparatus 700 may be a mobile phone, a computer, a digital broadcast terminal, a messaging device, a gaming console, a tablet, a medical device, exercise equipment, a personal digital assistant, and the like.

Referring to FIG. 7, the apparatus 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the apparatus 700, such as the operations associated with display, telephone calls, data communications, camera operations, and recording operations. The processing component 702 may include one or more processors 720 to execute instructions to perform all or part of steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the apparatus 700. Examples of such data include instructions for any applications or methods operated on the apparatus 700, contact data, phonebook data, messages, pictures, video, etc. The memory 704 may be realized using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the apparatus 700. The power component 706 may include a power management system, one or more power sources, and any other components associated with the generation, management, and distribution of power in the apparatus 700.

The multimedia component 708 includes a screen providing an output interface between the apparatus 700 and the user. In some embodiments, the screen may include a liquid crystal display (LCD) and a touch panel (TP). If the screen includes the touch panel, the screen may be realized as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive external multimedia data while the apparatus 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone configured to receive an external audio signal when the apparatus 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the apparatus 700. For instance, the sensor component 714 may detect an open/closed status of the apparatus 700, relative positioning of components, e.g., the display and the keypad, of the apparatus 700, a change in position of the apparatus 700 or a component of the apparatus 700, a presence or absence of user contact with the apparatus 700, an orientation or an acceleration/deceleration of the apparatus 700, and a change in temperature of the apparatus 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the apparatus 700 and other devices. The apparatus 700 can access a wireless network based on a communication standard, such as WiFi, 2G, 3G, 4G, or a combination thereof. In one exemplary embodiment, the communication component 716 receives a broadcast signal or broadcast associated information from an external broadcast management system via a broadcast channel In one exemplary embodiment, the communication component 716 further includes a near field communication (NFC) module to facilitate short-range communications. For example, the NFC module may be realized based on a radio frequency identification (RFID) technology, an infrared data association (IrDA) technology, an ultra-wideband (UWB) technology, a Bluetooth (BT) technology, and other technologies.

In exemplary embodiments, the apparatus 700 may be realized with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 704, executable by the processor 720 in the apparatus 700, for performing the above-described methods. For example, the non-transitory computer-readable storage medium may be a ROM, a RAM, a CD-ROM, a magnetic tape, a floppy disc, an optical data storage device, and the like.

One of ordinary skill in the art will understand that the above-described modules can each be implemented by hardware, or software, or a combination of hardware and software. One of ordinary skill in the art will also understand that multiple ones of the above-described modules may be combined as one module, and each of the above-described modules may be further divided into a plurality of sub-modules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for use in a terminal, comprising:
when a screen of the terminal is locked and it is determined that a user performs a first preset operation on a control key on the lock screen of the terminal, acquiring information regarding at least one smart device through a preset smart-home Internet-of-Things (IoT) protocol and displaying the acquired information on a control interface of the terminal; and
when it is detected that the user performs a second preset operation related to a smart device displayed on the control interface, controlling, according to the second preset operation, the smart device through the smart-home IoT protocol,
wherein the controlling, according to the second preset operation, of the smart device comprises:
determining an operation type of the second preset operation;
if the operation type indicates that the user clicks the smart device on the control interface, determining, according to a security attribute of the lock screen, whether to call a user interface of a smart device application corresponding to the smart device through the smart-home IoT protocol; and
if the operation type indicates that the user operates a control shortcut associated with the smart device, controlling, according to the operation on the control shortcut, the smart device through the smart-home IoT protocol.

2. The method according to claim 1, wherein the first preset operation is a long-press on the control key, and the method further comprises:
monitoring whether the user long-presses the control key; and
if a long-press on the control key is detected, determining that the user performs the first preset operation on the control key.

3. The method according to claim 1, wherein the first preset operation is a click on the control key, and the method further comprises:
monitoring whether the user clicks the control key; and
if a click on the control key is detected, determining that the user performs the first preset operation on the control key.

4. The method according to claim 1, wherein the first preset operation is a slide on the control key in a preset direction, and the method further comprises:
determining a direction of sliding the control key by the user; and
if the direction of sliding the control key matches a preset direction, determining that the user performs the first preset operation on the control key.

5. The method according to claim 1, wherein the acquiring of the information regarding the at least one smart device through the preset smart-home IoT protocol and the displaying of the acquired information on the control interface comprise:
determining a smart device application on the terminal through the preset smart-home IoT protocol, the smart device application being configured to control one or more smart devices;
acquiring, through the preset smart-home IoT protocol, a current operating state of a smart device controlled by the smart device application; and
displaying the smart device and the current operating state of the smart device on the control interface.

6. The method according to claim 1, wherein the determining, according to the security attribute of the lock screen, of whether to call the user interface of the smart device application corresponding to the smart device through the smart-home IoT protocol comprises:
  if the security attribute of the lock screen indicates that no password is set for the lock screen by the user, determining to call the user interface of the smart device application corresponding to the smart device.

7. The method according to claim 1, wherein the determining, according to the security attribute of the lock screen, of whether to call the user interface of the smart device application corresponding to the smart device through the smart-home IoT protocol comprises:
  if the security attribute of the lock screen indicates that a password is set for the lock screen by the user, displaying a pop-up page to receive user input of the password; and
  after receiving the user input of the password on the pop-up page, determining to call the user interface of the smart device application corresponding to the smart device through the smart-home IoT protocol.

8. The method according to claim 1, further comprising:
  displaying the user interface of the smart device application on the lock screen; and
  controlling the smart device through the user interface of the smart device application.

9. The method according to claim 8, wherein the controlling of the smart device through the user interface of the smart device application comprises:
  detecting a user instruction entered on the user interface of the smart device application; and
  sending the user instruction to the smart device through the smart-home IoT protocol.

10. The method according to claim 1, wherein the displaying of the acquired information on the control interface comprises:
  determining display parameters of the control interface; and
  displaying the control interface on the lock screen according to the display parameters.

11. An apparatus for controlling a smart device, comprising:
  a processor; and
  a memory storing instructions executable by the processor;
  wherein the processor is configured to:
    when a screen of the apparatus is locked and it is determined that a user performs a first preset operation on a control key on the lock screen, acquire information regarding at least one smart device through a preset smart-home Internet-of-Things (IoT) protocol and display the acquired information on a control interface; and
    when it is detected that the user performs a second preset operation related to a smart device displayed on the control interface, controlling, according to the second preset operation, the smart device through the smart-home IoT protocol,
  wherein in controlling, according to the second preset operation, the smart device through the smart-home IoT protocol, the processor is further configured to:
    determine an operation type of the second preset operation;
    if the operation type indicates that the user clicks the smart device on the control interface, determine, according to a security attribute of the lock screen, whether to call a user interface of a smart device application corresponding to the smart device through the smart-home IoT protocol; and
    if the operation type indicates that the user operates a control shortcut associated with the smart device, control, according to the operation on the control shortcut, the smart device through the smart-home IoT protocol.

12. The apparatus according to claim 11, wherein the processor is further configured to:
  monitor whether the user long-presses the control key; and
  if a long-press on the control key is detected, determine that the user performs the first preset operation on the control key.

13. The apparatus according to claim 11, wherein the processor is further configured to:
  determine a direction of sliding the control key by the user; and
  if the direction of sliding the control key matches a preset direction, determine that the user performs the first preset operation on the control key.

14. The apparatus according to claim 11, wherein the processor is further configured to:
  determine a smart device application installed on the terminal through the preset smart-home IoT protocol, the smart device application being configured to control one or more smart devices;
  acquire, through the smart-home IoT protocol, a current operating state of a smart device controlled by the smart device application; and
  display the smart device and the current operating state of the smart device on the control interface.

15. The apparatus according to claim 11, wherein the processor is further configured to:
  if the security attribute of the lock screen indicates that no password is set for the lock screen by the user, determine to call the user interface of the smart device application corresponding to the smart device.

16. The apparatus according to claim 11, wherein the processor is further configured to:
  if the security attribute of the lock screen indicates that a password is set for the lock screen by the user, display a pop-up page to receive user input of the password; and
  after receiving the user input of the password on the pop-up page, determine to call the user interface of the smart device application corresponding to the smart device through the smart-home IoT protocol.

17. The apparatus according to claim 11, wherein the processor is further configured to:
  display the user interface of the smart device application on the lock screen; and
  control the smart device through the user interface of the smart device application.

18. A non-transitory computer-readable storage medium storing instructions that, when executed by a processor in an apparatus for controlling a smart device, cause the apparatus to perform:
  when a screen of the apparatus is locked and it is determined that a user performs a first preset operation on a control key on the lock screen, acquiring information regarding at least one smart device through a preset smart-home Internet-of-Things (IoT) protocol and displaying the acquired information on a control interface; and when it is detected that the user performs a second preset operation related to a smart device displayed on the control interface, controlling, according to the second preset operation, the smart device through the smart-home IoT protocol, wherein the controlling, according to the second preset operation, of the smart device comprises:

determining an operation type of the second preset operation;

if the operation type indicates that the user clicks the smart device on the control interface, determining, according to a security attribute of the lock screen, whether to call a user interface of a smart device application corresponding to the smart device through the smart-home IoT protocol; and if the operation type indicates that the user operates a control shortcut associated with the smart device, controlling, according to the operation on the control shortcut, the smart device through the smart-home IoT protocol.

* * * * *